United States Patent
Telpaz et al.

(10) Patent No.: US 11,454,971 B2
(45) Date of Patent: Sep. 27, 2022

(54) METHODS AND SYSTEMS FOR LEARNING USER PREFERENCES FOR LANE CHANGES

(71) Applicant: GM GLOBAL TECHNOLOGY OPERATIONS LLC, Detroit, MI (US)

(72) Inventors: Ariel Telpaz, Givat Haim Meuhad (IL); Gila Kamhi, Zichron Yaakov (IL); Claudia V. Goldman-Shenhar, Mevasseret Zion (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 490 days.

(21) Appl. No.: 16/554,731

(22) Filed: Aug. 29, 2019

(65) Prior Publication Data

US 2021/0064033 A1 Mar. 4, 2021

(51) Int. Cl.
| | |
|---|---|
| *G05D 1/00* | (2006.01) |
| *G06N 5/04* | (2006.01) |
| *G06N 20/00* | (2019.01) |
| *B60W 50/06* | (2006.01) |
| *G05D 1/02* | (2020.01) |
| *B60W 30/18* | (2012.01) |
| *G06N 5/00* | (2006.01) |

(52) U.S. Cl.
CPC ..... *G05D 1/0088* (2013.01); *B60W 30/18163* (2013.01); *B60W 50/06* (2013.01); *G05D 1/0221* (2013.01); *G06N 5/003* (2013.01); *G06N 5/04* (2013.01); *G06N 20/00* (2019.01)

(58) Field of Classification Search
CPC .......... G06N 5/04; G06N 5/003; G06N 20/00; G05D 1/0221; G05D 1/0088; B60W 50/06

USPC .......................................................... 701/27
See application file for complete search history.

(56) References Cited

U.S. PATENT DOCUMENTS

| | | | | |
|---|---|---|---|---|
| 10,692,371 | B1 * | 6/2020 | Nix | G07C 5/008 |
| 10,800,408 | B2 * | 10/2020 | Xu | G05D 1/0238 |
| 2006/0009910 | A1 * | 1/2006 | Ewerhart | B60W 30/143 |
| | | | | 701/96 |
| 2014/0207325 | A1 * | 7/2014 | Mudalige | B62D 15/0255 |
| | | | | 701/25 |
| 2018/0047292 | A1 * | 2/2018 | Hashimoto | B60W 30/00 |
| 2018/0229723 | A1 * | 8/2018 | Jiang | B60W 10/20 |
| 2019/0016339 | A1 * | 1/2019 | Ishioka | G08G 1/16 |
| 2019/0047584 | A1 * | 2/2019 | Donnelly | B60W 30/025 |
| 2019/0061765 | A1 * | 2/2019 | Marden | G05D 1/0214 |
| 2019/0071099 | A1 * | 3/2019 | Nishiguchi | B60W 30/18163 |
| 2019/0187705 | A1 * | 6/2019 | Ganguli | B60W 30/12 |
| 2019/0187706 | A1 * | 6/2019 | Zhou | B60W 60/00 |
| 2019/0187707 | A1 * | 6/2019 | Zheng | B60W 50/0097 |
| 2019/0187708 | A1 * | 6/2019 | Zheng | B60W 50/00 |
| 2019/0206255 | A1 * | 7/2019 | Tao | G08G 1/166 |
| 2019/0212749 | A1 * | 7/2019 | Chen | B62D 15/0255 |
| 2019/0265060 | A1 * | 8/2019 | Han | G06N 20/00 |
| 2020/0356090 | A1 * | 11/2020 | Thakur | B60W 50/087 |
| 2021/0064033 | A1 * | 3/2021 | Telpaz | B60W 50/06 |

(Continued)

*Primary Examiner* — Yazan A Soofi
(74) *Attorney, Agent, or Firm* — Lorenz & Kopf LLP (57) ABSTRACT

Systems and methods are provided for controlling a vehicle. In one embodiment, a method includes: storing, in a data storage device, a decision model, wherein the decision model predicts when to automatically perform a motivational lane change; updating, by a processor, the decision model based on data obtained in response to user input; and automatically requesting, by the processor, a lane change based on the dynamically updated model.

16 Claims, 4 Drawing Sheets

(56) References Cited

U.S. PATENT DOCUMENTS

2021/0272394 A1\* 9/2021 Cella .................... G05B 13/042
2022/0219715 A1\* 7/2022 Xiao .................... B60W 10/10

\* cited by examiner

METHODS AND SYSTEMS FOR LEARNING USER PREFERENCES FOR LANE CHANGES

INTRODUCTION

The present disclosure generally relates to vehicles, and more particularly relates to methods and systems for learning user preferences for lane changes.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

While autonomous vehicles and semi-autonomous vehicles offer many potential advantages over traditional vehicles, in certain circumstances it may be desirable for improved operation of the vehicles. For example, autonomous vehicles or semi-autonomous vehicle recommend and perform lane changes. Some lane changes are performed to enhance the satisfaction of the user. For example, changing lanes in order to pass a slow-moving vehicle may be performed to enhance the user's satisfaction. Such lane changes that are not necessary but are performed to enhance the user's satisfaction are referred to as motivational lane changes. Since the motivational lane change is not necessary, the vehicle requests permission from the user before performing the lane change.

Accordingly, it is desirable to provide systems and methods for learning user preferences for motivational lane changes such that the operation may be automatically be performed by an autonomous or semi-autonomous vehicle. Furthermore, other desirable features and characteristics of the present disclosure will become apparent from the subsequent detailed description and the appended claims, taken in conjunction with the accompanying drawings and the foregoing technical field and background.

SUMMARY

Systems and methods are provided for controlling a vehicle. In one embodiment, a method includes: storing, in a data storage device, a decision model, wherein the decision model predicts when to automatically perform a motivational lane change; updating, by a processor, the decision model based on data obtained in response to user input; and automatically requesting, by the processor, a lane change based on the dynamically updated model.

In various embodiments, the dynamically updating is based on user input received directly from a user of the vehicle through a human machine interface.

In various embodiments, the user input includes positive feedback received in response to a system request to perform a lane change.

In various embodiments, the user input includes negative feedback received in response to a system request to perform a lane change.

In various embodiments, the user input includes a user request to perform a lane change when a system request to perform lane change is not presented to the user.

In various embodiments, the updating is based on user input received indirectly from a user of the vehicle when the user is navigating the vehicle.

In various embodiments, the decision model provides control parameters for controlling the vehicle to perform the lane change.

In various embodiments, the motivational lane change is a lane change that is performed for user satisfaction.

In various embodiments, the data includes vehicle behavior data, object data, environment data, road structure data, schedule data, sensor confidence data, and user profile data.

In another embodiment, a system for controlling a vehicle is provided. The system includes: a first data storage device that stores data defining a decision model, wherein the decision model predicts when to automatically perform a motivational lane change a processor configured to: update the decision model based on data obtained in response to user input; and automatically request a lane change based on the dynamically updated model.

In various embodiments, the processor updates based on user input received directly from a user of the vehicle through a human machine interface.

In various embodiments, the user input includes positive feedback received in response to a system request to perform a lane change.

In various embodiments, the user input includes negative feedback received in response to a system request to perform a lane change.

In various embodiments, the user input includes a user request to perform a lane change when a system request to perform lane change is not presented to the user.

In various embodiments, the processor updates based on user input received indirectly from a user of the vehicle when the user is navigating the vehicle.

In various embodiments, the decision model provides control parameters for controlling the vehicle to perform the lane change.

In various embodiments, the motivational lane change is a lane change that is performed for user satisfaction.

In various embodiments, the data includes vehicle behavior data, object data, environment data, road structure data, schedule data, sensor confidence data, and user profile data.

In various embodiments, the decision model includes a decision tree.

In various embodiments, the decision model includes a random forest.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
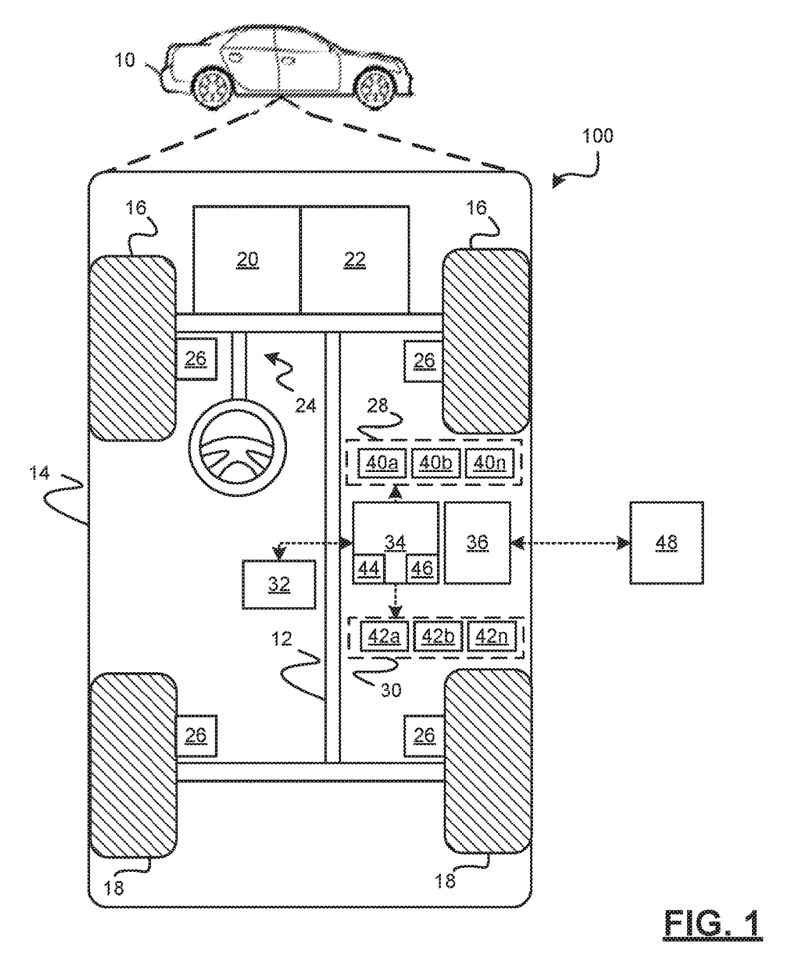
FIG. 1 is a functional block diagram illustrating an autonomous vehicle having a preference learning system, in accordance with various embodiments.

With reference to FIG. 1, a preference learning system shown generally at 100 is associated with a vehicle 10 in accordance with various embodiments. In general, the preference learning system 100 learns user preferences relating to motivational lane changes and personalizes control of the vehicle based on the learned preferences. The preference learning system 100 includes one or more machine learning models to learn the user preferences while the vehicle 10 is in operation. Over time, the learned user preferences will allow for the vehicle 10 to automate motivational lane changes with no need for user approval.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the interpretation system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, or simply robots, etc., that are regulated by traffic devices can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. As can be appreciated, in various embodiments, the autonomous vehicle 10 can be any level of automation or have no automation at all (e.g., when the system 100 simply presents the probability distribution to a user for decision making).

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, inertial measurement units, and/or other sensors. In various embodiments, the sensing devices 40a-40n include one or more image sensors that generate image sensor data that is used by the interpretation system 100.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
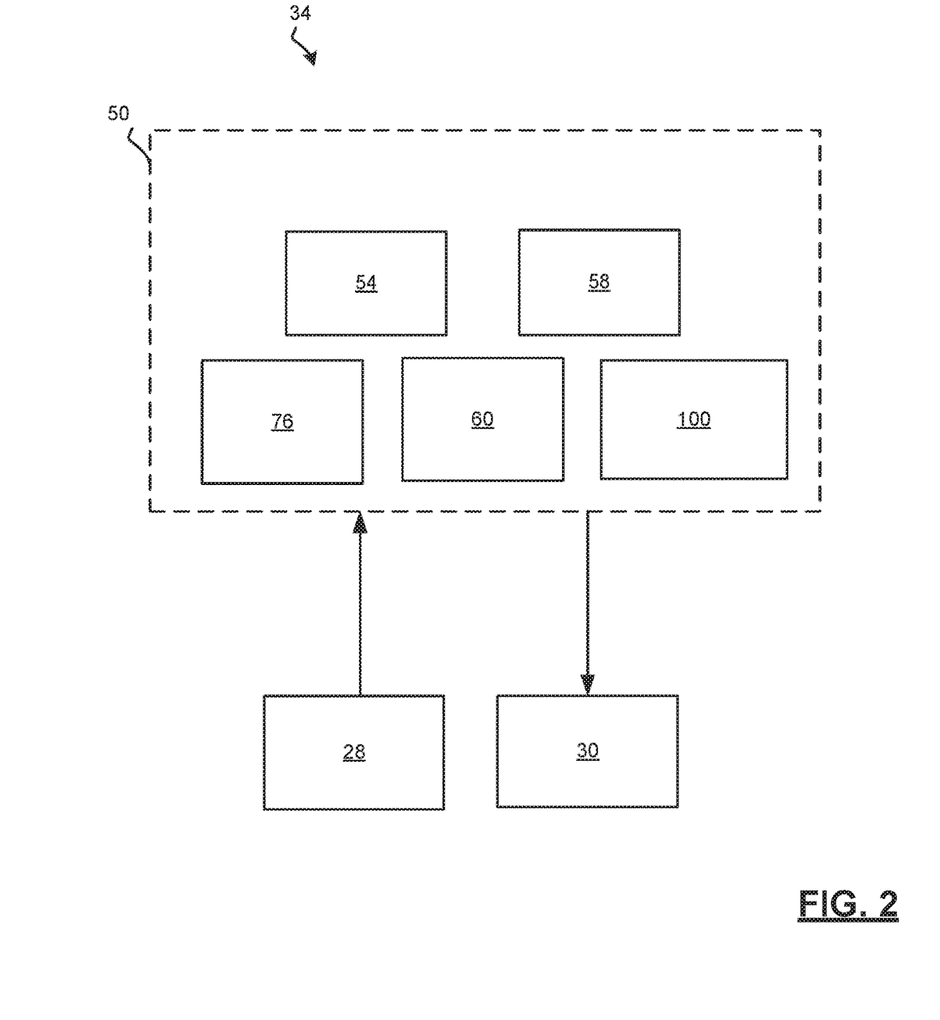
FIG. 2 is a dataflow diagram illustrating an autonomous driving system that includes the preference learning system, in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps are built from the sensor data of the vehicle 10. In various embodiments, the maps are received from a remote system and/or other vehicles. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the preference learning system 100 and, when executed by the processor 44, adaptively learns user preferences relating to motivational lane changes, and controls the vehicle 10 based on the learned user preferences.

As can be appreciated, the controller 34 may be implemented as multiple controllers including at least one residing on the vehicle and at least one residing remote from the vehicle. In such embodiments, functions of the system 100 may implemented on any of the controllers 34, including partially on a first controller of the vehicle and partially on a second controller residing for example on a server system.

As can be appreciated, the subject matter disclosed herein provides certain enhanced features and functionality to what may be considered as a standard or baseline non-autonomous vehicle or an autonomous vehicle 10, and/or an autonomous vehicle based remote transportation system (not shown) that coordinates the autonomous vehicle 10. To this end, a non-autonomous vehicle, an autonomous vehicle, and an autonomous vehicle based remote transportation system can be modified, enhanced, or otherwise supplemented to provide the additional features described in more detail below. For exemplary purposes the examples below will be discussed in the context of an autonomous vehicle.

In accordance with various embodiments, the controller 34 implements an autonomous driving system (ADS) 50 as shown in FIG. 2. That is, suitable software and/or hardware components of the controller 34 (e.g., the processor 44 and the computer-readable storage device 46) are utilized to provide an autonomous driving system 50 that is used in conjunction with vehicle 10.

In various embodiments, the instructions of the autonomous driving system 50 may be organized by function, module, or system. For example, as shown in FIG. 2, the autonomous driving system 50 can include a computer vision system 54, a positioning system 76, a guidance system 58, and a vehicle control system 60. As can be appreciated, in various embodiments, the instructions may be organized into any number of systems (e.g., combined, further partitioned, etc.) as the disclosure is not limited to the present examples.

In various embodiments, the computer vision system 54 synthesizes and processes sensor data and predicts the presence, location, classification, and/or path of objects and features of the environment of the vehicle 10. In various embodiments, the computer vision system 54 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 58 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like. In various embodiments, the preference learning system 100 of FIG. 1 may be included within the ADS 50.

Figure 3:
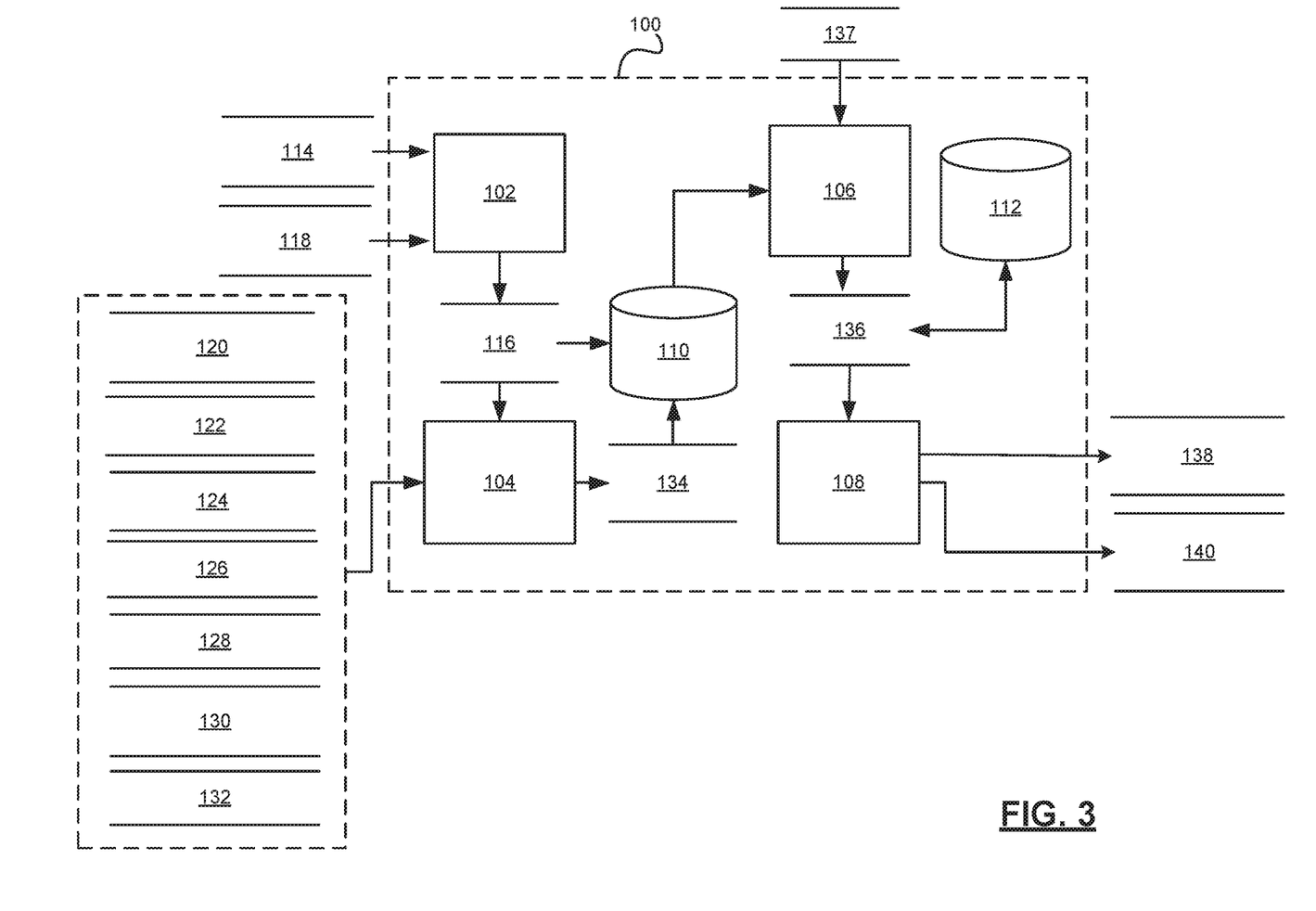
FIG. 3 is a dataflow diagram illustrating the preference learning system, in accordance with various embodiments.

As shown in more detail with regard to FIG. 3 and with continued reference to FIGS. 1 and 2, the preference learning system 100 may be implemented as a plurality of functional modules. As can be appreciated, the functional modules shown and described may be combined or further partitioned in various embodiments. A shown the modules include an enablement module 102, a data collection module 104, a learning module 106, a lane change determination module 108, a data datastore 110, and a model datastore 112.

The enablement module 102 monitors for conditions to enable the adaptive learning of motivational lane changes. In various embodiments, the enablement module 102 monitors user input data 114 received in response to a user interacting with an HMI associated with the vehicle 10 while the vehicle 10 is operating in an autonomous or semi-autonomous mode. For example, when the user input requests a lane change, the enablement module 102 determines if the user input request was received in response to a system recommendation to perform the lane change or if the user input was a random request, not in response to any recommendation. The enablement module 102 sets an enablement data 116 indicating the positive feedback and whether the request was in response to a recommendation. In another example, when the user input declines a lane change recommended by the system, the enablement module 102 sets the enablement data 116 indicating the negative feedback and that the request was in response to a recommendation.

In various embodiments, the enablement module 102 monitors vehicle navigation data 118 while the user is operating the vehicle 10 (e.g., an autonomous mode or a semi-autonomous mode is not operating). For example, when the navigation data 118 indicates that the user is performing a lane change, the enablement module 102 sets the enablement data 116 to indicate the user action and that it was not in response to any automated recommendation.

The data collection module 104 stores data relating to the lane change based on the enablement flag. For example, when the enablement flag is received, the data collection module 104 stores sample data 134 indicating current conditions associated with the vehicle 10, the environment of the vehicle 10, and the user of the vehicle 10. The sample data 134 is stored in the data datastore 110 and is associated with the enablement data 116. In various embodiments, the sample data 134 can be determined from data including, without limitation, vehicle behavior data 120, object data 122, environment data 124, road structure data 126, schedule data 128, sensor confidence data 130, and user profile data 132.

The vehicle behavior data 120 includes, for example, but is not limited to, a relative speed to a lead vehicle, a difference from a set speed, a relative longitudinal acceleration, a lateral acceleration, a heading, and a lane identifier, and a gap distance from the vehicle in front of the vehicle 10. The object data 122 includes, for example, but is not limited to, a position, a speed, a heading, an acceleration, and a type of other objects in the environment. The road structure data 126 includes, for example, but is not limited to, a number of lanes, a lane marker type (e.g., solid, dashed, color, etc.), a road type (e.g. highway), and a curvature of the road. The schedule data 128 includes, for example, but is not limited to, a time of day, a destination (e.g. work, home, etc.). The environment data 124 includes, for example, but is not limited to visibility (e.g., rain, sunny), road condition (e.g., icy, snowy, wet, etc.). The sensor confidence data 130 includes, for example, but is not limited to a confidence level of each of the sensors. The driver profile data 132 includes, for example, but is not limited to a driver profile, and a driving mode.

The learning module 106 updates a decision model 136 used in automating a lane change based on the stored data. In various embodiments, the decision model 136 is stored in the model datastore 112 and includes one or more machine learning models. The machine learning models are updated based on supervised, unsupervised, semi-supervised, or reinforcement learning and the stored data. Examples of machine learning models include, but are not limited to, artificial neural networks (ANN) (such as a recurrent neural networks (RNN) and convolutional neural network (CNN)), decision tree models (such as classification and regression trees (CART)), ensemble learning models (such as boosting, bootstrapped aggregation, gradient boosting machines, and random forests), Bayesian network models (e.g., naive Bayes), principal component analysis (PCA), support vector machines (SVM), clustering models (such as K-nearest-neighbor, K-means, expectation maximization, hierarchical clustering, etc.), and linear discriminant analysis models. In various embodiments, the decision models 136 are updated for each individual user and predict when to automatically perform a lane change and how to automatically perform the lane change (e.g., timing, speed, gap spacing, etc.).

In various embodiments, the learning module 106 updates the decision model 136 following the storing of each sample data 134. In various embodiments, the learning module 106 updates the decision model 136 only after several samples of sample data 134 have been stored in the data datastore 110. In various embodiments, the learning module 106 updates the decision model 136 based on samples 137 collected from a group of vehicles 10. This facilitates the learning of elements in a model that is shared by many users. Thereafter, the general model can be combined with the user personal preferences. When multiple users exist for the vehicle 10, the learning module 106 updates a decision model 136 for each user.

The lane change determination module 108 determines when a lane change is to be automatically performed based on the updated decision model 136. For example, as the model accuracy improves (the percentage of rejections by the user decreases) the lane change action will become more automatic and less dependent on a user's approval. In various embodiments, the lane change determination module 108 determines a confidence of the accuracy of the decision model 136 and then generates a request 138 to automatically perform the lane change based on the confidence. The confidence can be determined and evaluated based on the type of the decision model used. For example, the confidence can be determined to be sufficient to automatically enable the lane change when a final node impurity (entropy) is below a determined threshold. In another example, the confidence can be determined to be sufficient to automatically enable the lane change when nodes involved in the decision are constructed from a number of samples above a threshold. In various embodiments, the confidence can be determined to be sufficient to automatically enable the lane change based on a proportion of positively voting trees (e.g., for a random forest model).

Once the automatic request 138 to make a lane change maneuver is generated, any control settings 140 associated with the lane change maneuver are provided. For example, the settings stored in or associated with the decision model 136 are retrieved, the settings can include control parameters for performing the lane change as the user has performed in the past or as the user has indicated how to perform in the past (e.g., obtained from the sample data 134).

Figure 4:
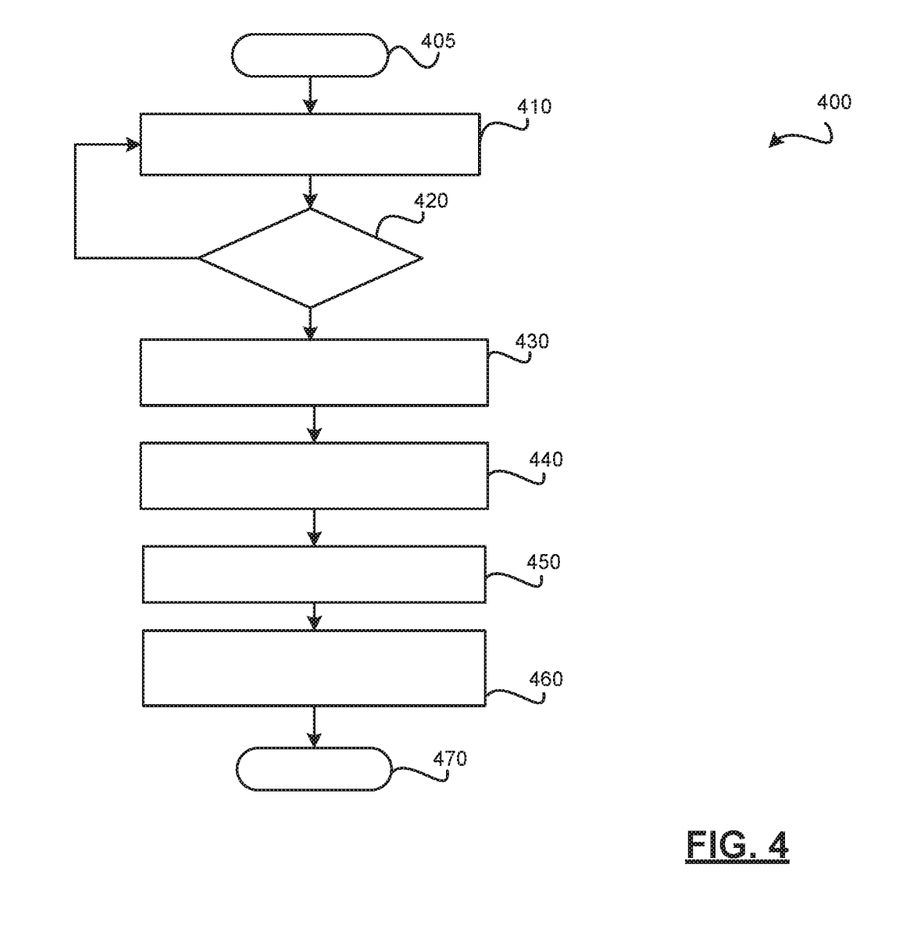
FIG. 4 is a flowchart illustrating a learning method that may be performed by the preference learning system, in accordance with various embodiments.

Referring now to FIG. 4 and with continued reference to FIGS. 1-3, a learning method 400 is shown in accordance with various embodiments. As can be appreciated, in light of the disclosure, the order of operation within the method 400 is not limited to the sequential execution as illustrated in FIG. 4 but may be performed in one or more varying orders as applicable and in accordance with the present disclosure. In various embodiments, one or more steps of the method 400 may be removed or added without altering the spirit of the methods 400.

In one embodiment, the method 400 may begin at 405. The user input data 114 and/or the navigation data 118 are received at 410. The user input data 114 and/or the navigation data 118 are evaluated at 420 to determine if enablement conditions are met. When enablement conditions are not met at 420, the method continues to monitor for user input data 114 and/or navigation data 118. When enablement conditions are met at 420, the enablement data 116 is set to indicate the conditions for sampling the data at 430. The sample data 134 is collected and stored at 440.

Thereafter, the decision model 136 is retrieved from the model datastore 112 and updated at 450. As can be appreciated, the decision model 136 can be updated after any number of samples have been stored, in various other embodiments, as the method illustrates only after a single sample.

The updated decision model 136 is used to determine when to generate the request 138 for an automatic lane change and to provide control settings 140 at 460. As can be appreciated, the request 138 can be generated at any time based on conditions and is not limited to the sequential execution as illustrated. Thereafter, the method may end at 470.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling a vehicle, comprising:
storing, in a data storage device, a decision model, wherein the decision model predicts when to automatically perform a motivational lane change and provides control parameters for controlling the vehicle to perform the motivational lane change, wherein the motivational lane change is a lane change that is based on a user's preference to pass another vehicle or object;
updating, by a processor, the decision model based on data obtained in response to user input indicating user preferences associated with lane changes; and
automatically requesting, by the processor, a lane change based on the updated model.

2. The method of claim 1, wherein the updating is based on user input received directly from a user of the vehicle through a human machine interface.

3. The method of claim 2, wherein the user input includes positive feedback received in response to a system request to perform a lane change.

4. The method of claim 2, wherein the user input includes negative feedback received in response to a system request to perform a lane change.

5. The method of claim 3, wherein the user input includes a user initiated request to perform a lane change when the system request to perform the lane change is not presented to the user.

6. The method of claim 1, wherein the updating is based on user input received indirectly from a user of the vehicle when the user is navigating the vehicle.

7. The method of claim 1, wherein the data includes vehicle behavior data, object data, environment data, road structure data, schedule data, sensor confidence data, and user profile data.

8. A system for controlling a vehicle, comprising:
a first data storage device that stores data defining a decision model, wherein the decision model predicts when to automatically perform a motivational lane change, wherein the decision model provides control parameters for controlling the vehicle to perform the lane change, wherein the motivational lane change is a lane change that is based on a user's preference to pass another vehicle or object; and
a processor configured to:
update the decision model based on data obtained in response to user input indicating user preferences associated with lane changes; and
automatically request a lane change based on the updated model.

9. The system of claim 8, wherein the processor updates based on user input received directly from a user of the vehicle through a human machine interface.

10. The system of claim 9, wherein the user input includes positive feedback received in response to a system request to perform a lane change.

11. The system of claim 9, wherein the user input includes negative feedback received in response to a system request to perform a lane change.

12. The system of claim 10, wherein the user input includes a user initiated request to perform a lane change when the system request to perform the lane change is not presented to the user.

13. The system of claim 8, wherein the processor updates based on user input received indirectly from a user of the vehicle when the user is navigating the vehicle.

14. The system of claim 8, wherein the data includes vehicle behavior data, object data, environment data, road structure data, schedule data, sensor confidence data, and user profile data.

15. The system of claim 8, wherein the decision model includes a decision tree.

16. The system of claim 8, wherein the decision model includes a random forest.

* * * * *